D. D. STERNBERGH.
TRANSMISSION GEAR CASING.
APPLICATION FILED JAN. 13, 1915.
1,143,661.
Patented June 22, 1915.
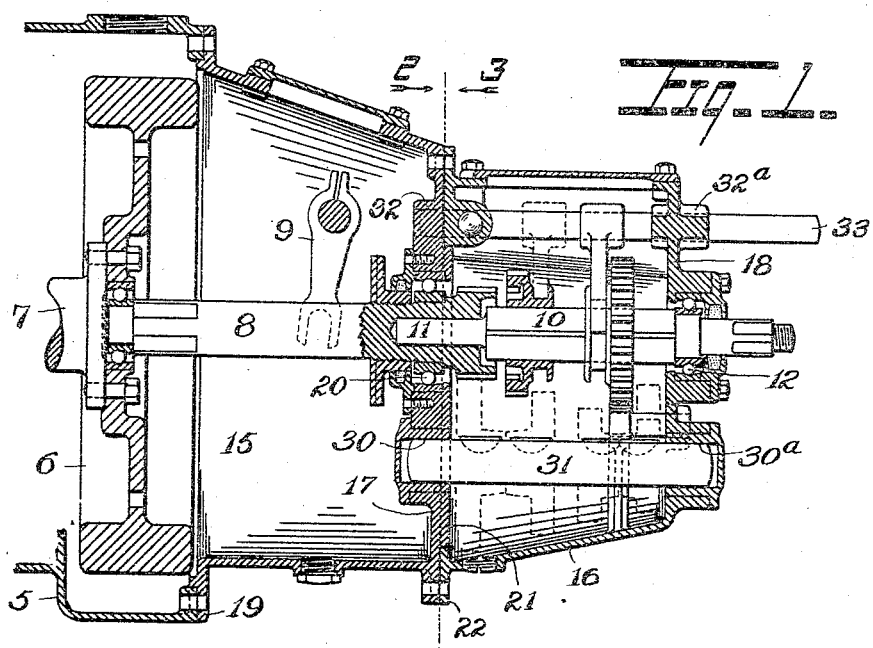
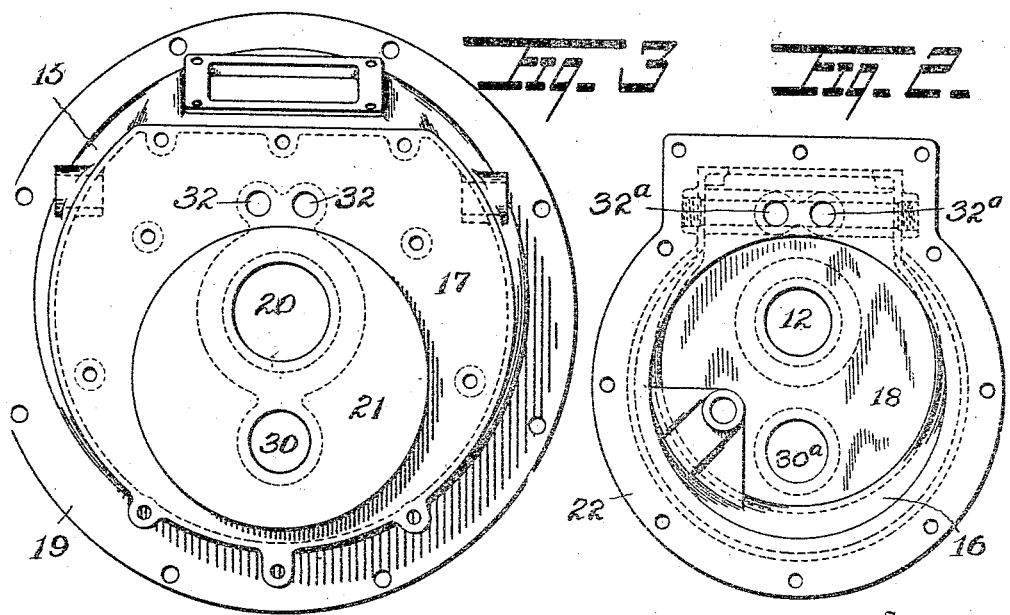
Witnesses
V. L. Stratton
Caleb J. Bieber
Inventor
David D. Sternbergh,
By W.G. & D.M. Stewart
Attorneys

UNITED STATES PATENT OFFICE.

DAVID D. STERNBERGH, OF READING, PENNSYLVANIA, ASSIGNOR TO AMERICAN DIE AND TOOL COMPANY, OF READING, PENNSYLVANIA, A CORPORATION OF PENNSYLVANIA.

TRANSMISSION-GEAR CASING.

1,143,661.

Specification of Letters Patent. Patented June 22, 1915.

Application filed January 13, 1915. Serial No. 1,903.

*To all whom it may concern:*

Be it known that I, DAVID D. STERNBERGH, a citizen of the United States, residing at Reading, in the county of Berks and State of Pennsylvania, have invented certain new and useful Improvements in Transmission-Gear Casings, of which the following is a specification.

This invention relates particularly to transmission-gear mechanism for automobiles, and consists essentially in an improved construction comprising a two-part transmission-gear casing in which a shaft-bearing end wall is separately formed on each of the subsequently united parts or sections, so as to provide for especially convenient and accurate finishing and assembling, and neat appearance of the completed mechanism.

The invention is fully described in connection with the accompanying drawings, and the novel features are specifically pointed out in the claims.

Figure 1 is a longitudinal sectional view indicating the essential parts of a complete transmission gear embodying the invention. Figs. 2 and 3 are end views of the separated casing sections, looking in the direction of the arrows 2 and 3 respectively, of Fig. 1.

The drawing indicates an ordinary automobile engine casing 5, inclosing the fly wheel 6 on the engine shaft 7; together with the usual clutch-engaged shaft extension 8; only the operating lever 9 of the clutch mechanism being shown. This extension shaft 8 with its clutch mechanism, and the main transmission shaft 10 with the change gear mechanism used in connection therewith, are mounted on and inclosed by the improved two-part casing shown, which constitutes the essential feature of my invention as fully described.

This improved transmission-gear casing comprises two separately formed hollow sections, marked 15 and 16 respectively, each of which is formed with a single end wall, 17 and 18 respectively; these walls are formed with openings which form bearings for the opposite ends of the inclosed shafts when the two sections are brought together in a unitary structure. Each section is separately finished, in such a manner as to accurately aline the coöperating bearings in the spaced-apart end walls, when the two sections are united, thereby securing convenience and accuracy both in machining and assembling the parts of the structure.

The open end of the casing section 15 is formed with a bolting rim 19 which is adapted to the particular motor casing 5 to which it is to be applied. The wall 17 at its reduced opposite end, which is provided with a suitable central bearing 20 for the outer end of the motor shaft extension 8, has formed on its outer face an eccentric boss 21, upon which the separate casing section 16 is accurately fitted in uniting the sections by means of the bolting rim 22. The main transmission or drive shaft 10 is mounted in a bearing 12 therefor formed in the end wall 18 of casing 16 and its reduced opposite end 11 is supported in the recessed end of shaft 8, as shown. The end walls 17 of section 15, and 18 of section 16, are formed as shown with corresponding bearings 30 and 30ᵃ respectively for the change-gear countershaft 31, and 32, 32ᵃ respectively for the operating-lever shaft or shafts 33; which properly spaced-apart bearings are brought into accurate alinement in uniting the sections. In assembling the structure these shafts, with their attached parts fixed thereto, are conveniently placed in the section 16, and then properly engaged in the bearings of section 15 in uniting the two sections. The transmission gear casing thus formed is one that may be readily cast and quickly and accurately machined and assembled, the eccentric boss 21 assisting in such assembly and the united sections presenting a neat and pleasing appearance.

What I claim is:

1. A unitary transmission-gear casing comprising two separately formed approximately cylindrical sections, each provided with a shaft-bearing wall at one end thereof only, and with a bolting rim at the other end; each of said end walls being provided with a series of independently formed shaft-bearing apertures adapted to aline respectively with those of the other end wall when the sections are united.

2. In combination with a motor and a casing therefor; a unitary transmission-gear casing comprising two separately formed approximately cylindrical sections, each provided with a shaft-bearing wall at one end thereof only, and with a bolting rim at the other end; each of said end walls being provided with a series of independently formed shaft-bearing apertures adapted to aline respectively with those of the other end wall when the sections are united; a clutch-engaged motor-shaft extension inclosed by one of said casing sections and mounted in the end wall thereof; a main transmission shaft inclosed by the other casing section and mounted at its opposite ends in the end wall of said section and in said motor-shaft extension respectively; a countershaft, and change-gear-lever shaft, mounted at their opposite ends in the end walls of the respective casing sections; and gears connecting said main shaft and counter shaft, substantially as set forth.

In testimony whereof I affix my signature in presence of two witnesses.

DAVID D. STERNBERGH.

Witnesses:
Wm. H. Beaver,
D. M. Stewart.